(12) United States Patent
Calpe Maravilla et al.

(10) Patent No.: US 9,152,287 B2
(45) Date of Patent: Oct. 6, 2015

(54) SYSTEM AND METHOD FOR DUAL-TOUCH GESTURE CLASSIFICATION IN RESISTIVE TOUCH SCREENS

(75) Inventors: Javier Calpe Maravilla, Algemesi (ES); Alberto Carbajo Galve, San Antonio de Benageber (ES); Maria José Martinez, Massamagrell (ES)

(73) Assignee: ANALOG DEVICES, INC., Norwood, MA (US)

( * ) Notice: Subject to any disclaimer, the term of this patent is extended or adjusted under 35 U.S.C. 154(b) by 905 days.

(21) Appl. No.: 12/851,291

(22) Filed: Aug. 5, 2010

(65) Prior Publication Data
US 2012/0032893 A1    Feb. 9, 2012

(51) Int. Cl.
G06F 3/041    (2006.01)
G06F 3/045    (2006.01)

(52) U.S. Cl.
CPC ...... *G06F 3/045* (2013.01); *G06F 2203/04104* (2013.01)

(58) Field of Classification Search
CPC ............... G06F 2203/04104; G06F 3/045
USPC ................................. 345/173, 174
See application file for complete search history.

(56) References Cited

U.S. PATENT DOCUMENTS

| | | | |
|---|---|---|---|
| 3,750,149 A | 7/1973 | Sessler et al. | |
| 7,633,300 B2 | 12/2009 | Keroe et al. | |
| 8,106,892 B2 | 1/2012 | Felder et al. | |
| 8,416,215 B2 | 4/2013 | Sherman | |
| 8,797,277 B1 | 8/2014 | Grygorenko | |
| 2002/0101407 A1 | 8/2002 | Berelovich et al. | |
| 2006/0197752 A1 | 9/2006 | Hurst et al. | |
| 2006/0284856 A1 | 12/2006 | Soss | |
| 2007/0052690 A1 | 3/2007 | Roberts | |
| 2007/0200833 A1 | 8/2007 | Park et al. | |
| 2008/0117178 A1 | 5/2008 | Ko et al. | |
| 2009/0044988 A1 | 2/2009 | Chang et al. | |
| 2009/0066663 A1 | 3/2009 | Chang et al. | |
| 2009/0073134 A1 | 3/2009 | Huang et al. | |
| 2009/0189877 A1* | 7/2009 | Washino et al. | 345/174 |
| 2009/0322699 A1 | 12/2009 | Hansson | |
| 2009/0322700 A1* | 12/2009 | D'Souza et al. | 345/174 |

(Continued)

OTHER PUBLICATIONS

Charles Murray, "Resistive Panels Move Into Multi-touch Space", Design News, Jun. 30, 2011.

(Continued)

*Primary Examiner* — Kumar Patel
*Assistant Examiner* — Kuo Woo
(74) *Attorney, Agent, or Firm* — Kenyon & Kenyon LLP (57) ABSTRACT

A system and method for classifying touches input into a four-wire resistive touch screen is presented. A voltage may be applied to electrodes in a layer making it the active layer. A first set of four voltages may be measured by a voltage sensing circuit from electrodes in the active layer of a touch screen and a passive layer of a touch screen. The voltage may be switched from electrodes of the first layer to the electrodes of the second layer. A voltage sensing circuit may measure a second set of four voltages nearly simultaneously from electrodes in the active layer and the passive layer of a touch screen. Each set of measured voltages from the passive layer and or the active may be processed. A rule set may be applied to the processing results. An indication of the type of touch that was applied to the touch screen may be provided and optionally including quantitative results.

31 Claims, 9 Drawing Sheets

(56) References Cited

U.S. PATENT DOCUMENTS

| | | |
|---|---|---|
| 2009/0322701 A1 | 12/2009 | D'Souza et al. |
| 2010/0001977 A1 | 1/2010 | Lin et al. |
| 2010/0053109 A1 | 3/2010 | Narita |
| 2010/0164905 A1 | 7/2010 | Woo et al. |
| 2010/0277417 A1* | 11/2010 | Sarasmo .................. 345/173 |
| 2010/0283761 A1 | 11/2010 | Chang |
| 2011/0043462 A1* | 2/2011 | Shabra et al. ............. 345/173 |
| 2012/0001854 A1 | 1/2012 | Tikkanen |
| 2012/0032893 A1 | 2/2012 | Calpe Maravilla et al. |
| 2012/0068969 A1 | 3/2012 | Bogana et al. |

OTHER PUBLICATIONS

Phil Ling, "Resistive Multi-Touch Becomes Reality", EE Times, Mar. 7, 2011.
PCT International Search Report from PCT/US11/46310 mailed on Dec. 19, 2011.
Analog Devices, Inc., "Low Voltage Controller for Touch Screens," AD7879 Datasheet, Rev. C, Nov. 2010.
International Search Report and Written Opinion of the International Searching Authority in counterpart International Application No. PCT/US2012/48474, report dated Oct. 10, 2012.

* cited by examiner

SYSTEM AND METHOD FOR DUAL-TOUCH GESTURE CLASSIFICATION IN RESISTIVE TOUCH SCREENS

BACKGROUND

The present invention relates to touch screen devices and to classifying touch gestures entered to a touch screen. In particular, it relates to classifying a dual touch gesture input to a four-wire resistive touch screen.

Figure 1:
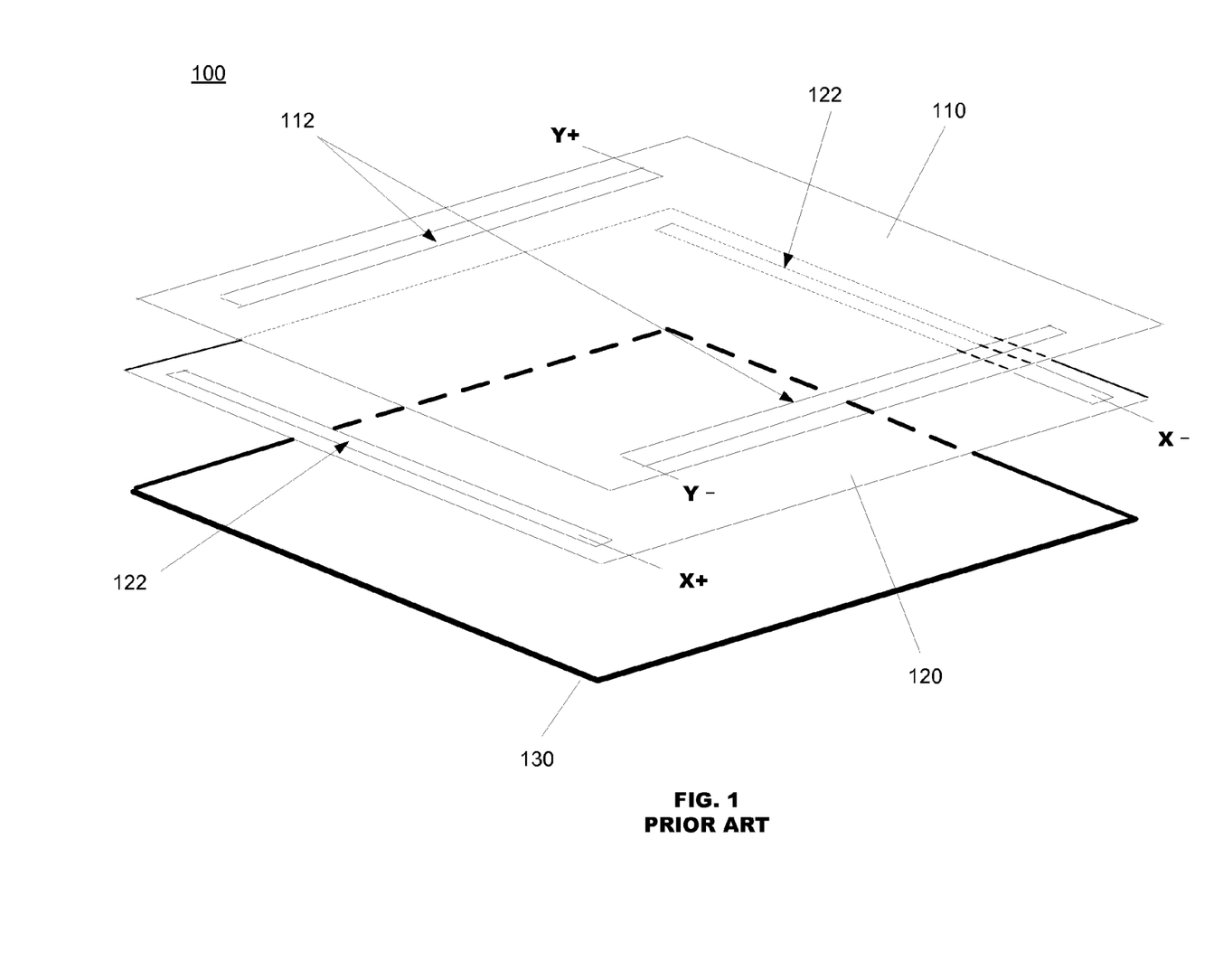
FIG. 1 illustrates a conventional 4-wire resistive touch screen.

Generally, the structure of a 4-wire resistive touch screen is well known. FIG. 1 illustrates a typical 4-wire resistive touch screen. The illustrated 4-wire resistive touch screen 100 has a first plastic film layer 110 (a Y layer) with a transparent resistive coating on a bottom side, and a pair of electrodes 112 at the vertical edges of the layer. Spaced apart from the Y layer is a second plastic film layer 120 (X layer) with a transparent, resistive coating on a top side, and a pair of electrodes 122 at the horizontal edges of the layer. Below the two plastic film layers 110, 120 is an LCD screen 130 that displays image content that is viewed on the touch screen device.

During a typical classical operation, a user touches a point on the screen which causes the Y layer to deflect and make contact with the X layer. The X, Y coordinates of the point of contact can be determined during two phases of operation. In a first phase, voltage is driven on a first layer (say, the Y layer) and a voltage is read from a single electrode of the second layer (the X layer). In a second phase, a voltage is driven on the second layer (the X layer), and a voltage is read from a single electrode of the first layer (Y layer). A high impedance input device is used to read voltages from the sensing layer in each phase, which minimizes voltage losses in the sensing layer. In other terms, the layer that is driven by the applied voltage may be called the "active" layer, and the sensing layer may be called the "passive" layer. Thus, both input voltages are digitized and converted to a value representing the point of contact in the coordinate axis at which the layers touch each other.

It may be desirable for a user to interact with the screen via multiple points of contact. Multi-touch cases present additional challenges. When multiple touches are performed, voltage losses can occur in the sensing layer and, therefore, the voltages present at electrodes of the sensing layer no longer directly represent the point of contact in the driving layer.

Some touch screen systems have attempted to detect dual positions of contact. The X and Y layers in other systems may be provided with complex conductive patterns that are expensive to manufacture. There is a need for another less complex and expensive method and system for classifying gestures performed on conventional 4 wire resistive touch screens.

DETAILED DESCRIPTION

Embodiments of the present invention provide a gesture detection device and method for processing dual touch gestures inputs to a 4-wire resistive touch screen. The method may include reading voltages from a first pair of electrodes on a first resistive sheet and a second pair of electrodes on a second resistive sheet during a first phase of operation, while a predetermined potential is driven across a first resistive sheet material of the device. The method further may include reading voltages from the first and second pair of electrodes during a second phase of operation, while a predetermined potential is driven across the second resistive sheet material.

An exemplary method may include steps in a first phase during which a voltage may be applied to electrodes of a first touch screen layer to cause the first layer to be an active layer, wherein a voltage is not applied to electrodes of a second layer of the touch screen that is a passive layer. A first set of four voltages may be measured by a voltage detection circuit from the two electrodes in an active layer of a touch screen and the two electrodes of a passive layer of a touch screen. The first set of four voltage measurements may be stored in a memory. In a second phase, the voltage may be switched from electrodes of the first layer to the electrodes of the second touch screen layer to cause the second layer to be the active layer. The voltage detection circuit may measure a second set of four voltages from the two electrodes in an active layer of a touch screen and the two electrodes of a passive layer of a touch screen. The second set of four voltage measurements may be stored in a memory. Each set of measured voltages from the active layer may be processed to determine a delta voltage (difference voltage) between the voltages measured at each electrode of the active layer, when each of the Y layer and the X layer are the active layer. Each set of measured voltages from the active layer may be processed to determine a trend between the voltages measured at each electrode of the passive layer, when each of the Y layer and the X layer are the active layer. A rule set may be applied to the processing results of the voltages measured from the active layers and the passive layers. An indication of the type of touch that was applied to the touch screen may be provided based on the results of the application of the rule set.

Alternatively, only the voltage differences between the two electrodes of the active layers and the voltage differences between the voltages of the electrodes of the passive layer may be stored since these may be used directly to recognize the gestures. In another alternative, the voltage differences may be measured directly.

The detector may include inputs, receiving circuitry and processing circuitry with outputs. The inputs may connect a 4-wire, resistive touch screen input device to a touch screen controller device. The inputs also allow for measurement of each electrode of the pair electrodes in both X and Y layers. The inputs may be connected to receiving circuitry that measures a voltage at each of the electrodes in the active layer and at each of the electrodes in the passive layer. The results of the voltage measurements may be provided to an analog-to-digital converter (ADC). The ADC may be connected to processing circuitry, and may output digital codes representative of the measurements from each electrode to the processing circuitry. The processing circuitry may be configured to store the digital codes representing the separate voltage measurements made during each sampling period. The processing circuitry may also be configured to determine the voltage drop across an active layer in both the X direction and in the Y direction by determining differences between measurements at the X+, X− electrodes in the X direction and Y+, Y− in the Y direction, when each is the respective active layer. The processor may classify the input, based on the measurements as either a single touch or a dual touch, and in this latter case, may analyze the measurement's time evolution in order to classify the dual-touch gesture. In the latter case, a dual touch gesture, such as a zoom, a pinch, a CW rotation, a CCW rotation or a sliding may be recognized.

A system using external processing circuitry may also be implemented in which signals indicating the sampled electrode voltages from the active and passive layers are provided in a standard format that allows a host processor to implement its own gesture classification algorithms.

Figure 2:
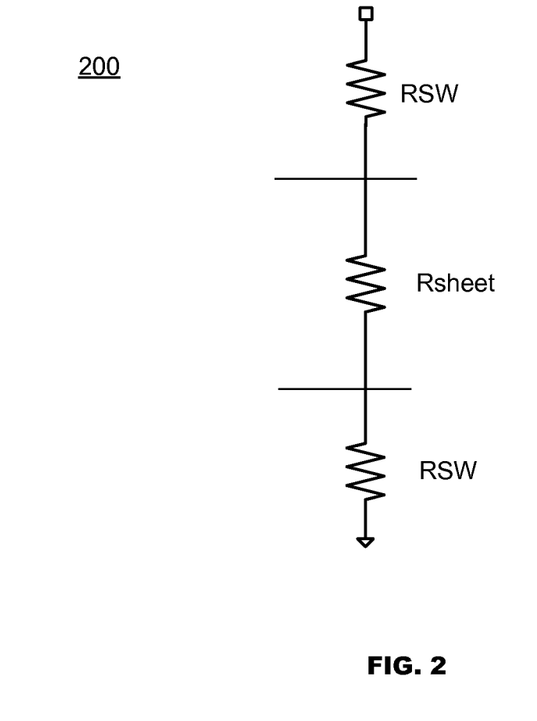
FIG. 2 illustrates an electrical equivalent circuit of a conventional touch screen when NO touches occur.

FIG. 2 illustrates an electrical equivalent circuit of a conventional touch screen when NO touches occur. In the absence of a touch to the touch screen, the resistances in the circuit 200 may include switch resistances RSW and a sheet resistance Rsheet. The passive layer contributes no, or a negligible amount of, resistance to the sheet resistance. The circuit parameters, such as the sheet resistance of both layers, switch resistance values, the value of the DC voltage that is to be driven to the active layer, the expected voltage value at each electrode on the active layer, may be known apriori. When the touch screen is touched either by one touch or two touches, these circuit parameters may change.

Figure 3:
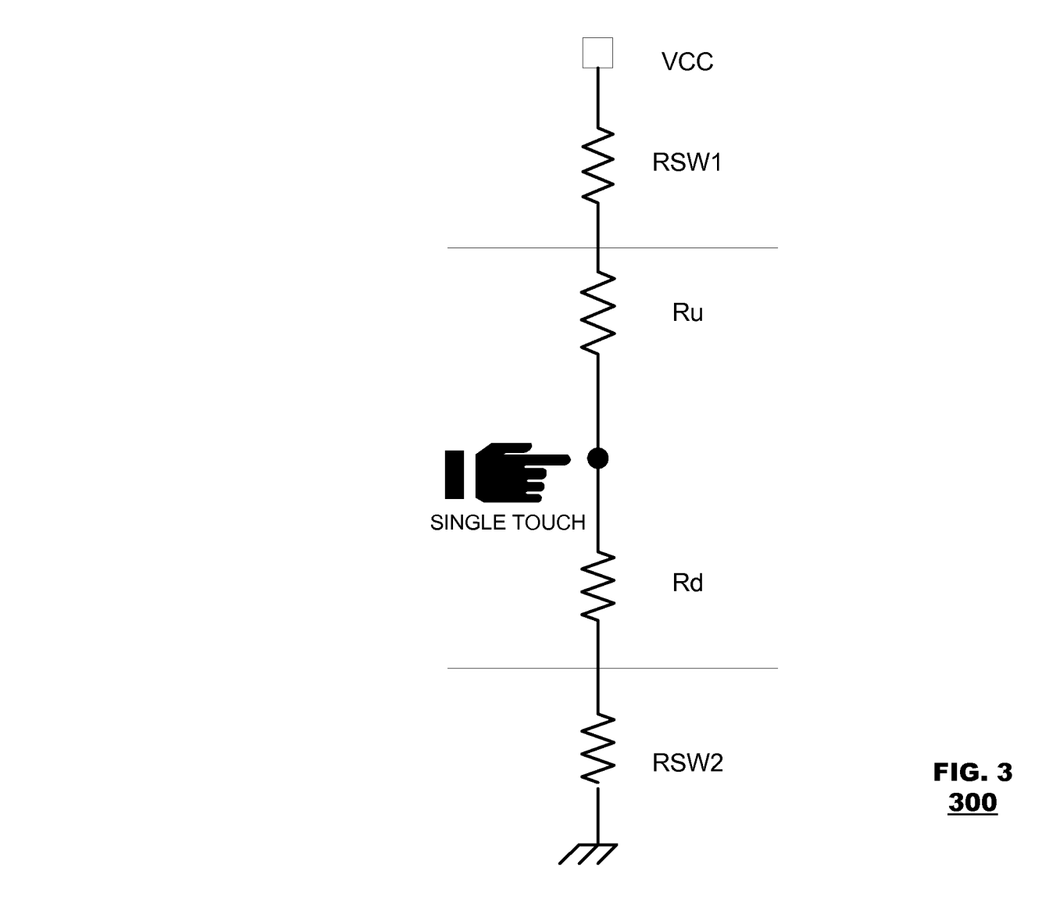
FIG. 3 illustrates an electrical equivalent circuit of a conventional touch screen when a single touch occurs.

FIG. 3 illustrates an electrical equivalent circuit when a single touch is applied to a conventional touch screen. As shown in FIG. 3, a single touch results in the sheet resistance Rsheet, shown in FIG. 2, of the touchscreen 300 may be separated conceptually as discrete resistances Ru and Rd on either side of the touch. Since the passive layer is an equipotential surface in the case of a single touch, a voltage may be measured at either of the two electrodes in the passive layer. The location of the X and Y coordinates of the single touch may be determined using known conversion techniques, such as by using a single-ended ratiometric conversion.

Figure 4:
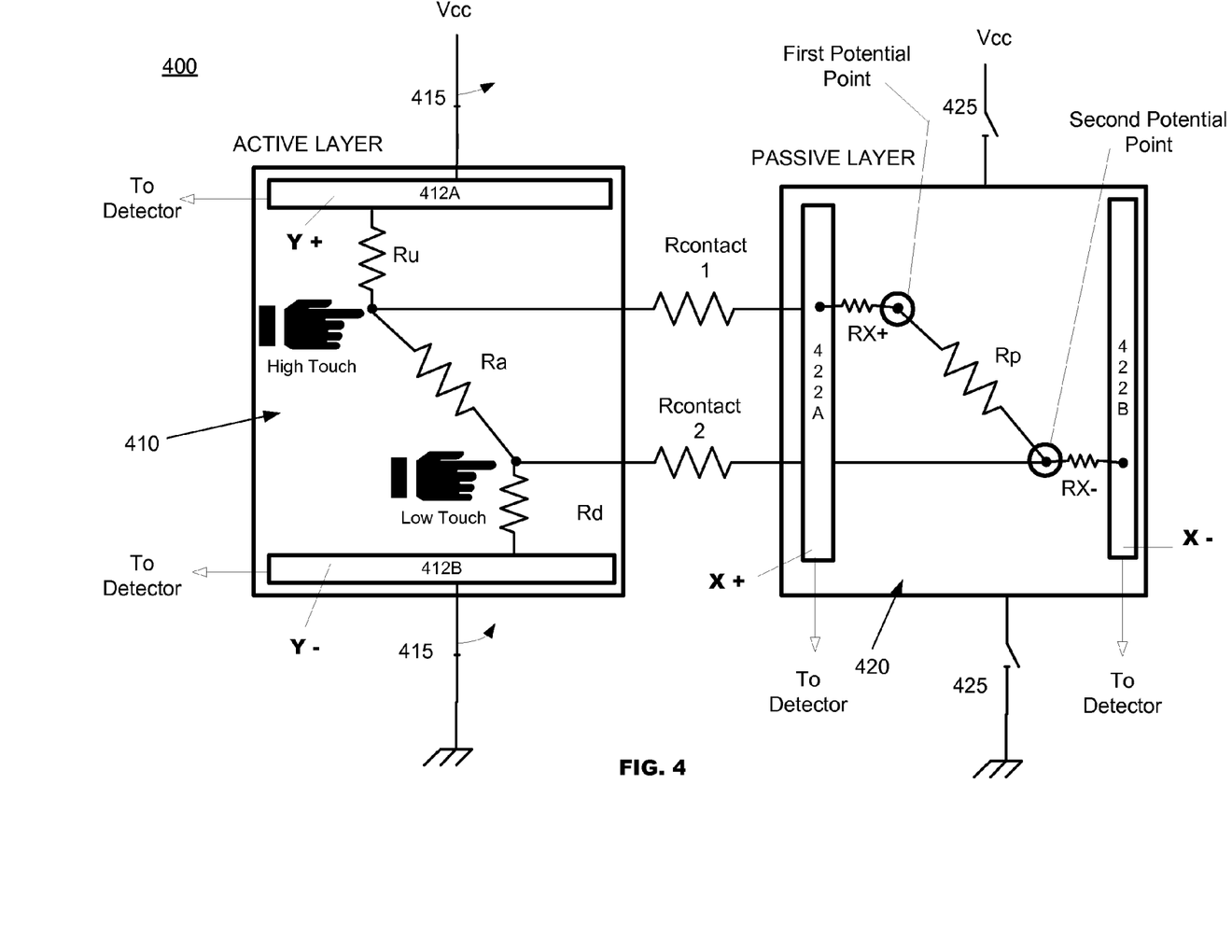
FIG. 4 illustrates an exemplary scenario of when two touches are applied to a 4-wire touch screen according to an embodiment of the present invention.

FIG. 4 illustrates an exemplary scenario of when two touches are applied to a 4-wire touch screen according to an embodiment of the present invention. Since the touch screen layers are alternately the active and passive layers, for ease of explanation, the Y layer will be described as the active layer. The 4-wire touch screen 400 includes, in the active layer, switches 415, active layer electrodes 412A (Y+) and 412B (Y−) and, in the passive layer, electrodes 422A (X+) and 422B (X−). The electrodes 412A, 412B, 422A and 422B are each connected to a detector circuit for detecting the voltage values at each of the electrodes.

As mentioned with respect to FIG. 2, the active layer may have a sheet resistance and each switch 415 may have a resistance. When two touches, e.g., a high touch and a low touch, as shown in FIG. 4, are applied to the touch screen 400, the sheet resistance of the active layer 410 may be conceptually segmented into representative resistances Ru, Ra and Rd of the overall sheet resistance. The resistance Ru may represent the component of sheet resistance from the electrode 412A to the location of the high touch. The resistance Ra may represent the component of sheet resistance from the location of the high touch to the location of the low touch, and the resistance Rd may represent the component of sheet resistance from the location of the low touch to the electrode 412B. In addition, there is a contact resistance Rcontact1 that may result from the touching of the active layer 410 to the passive layer 420 at the location of the high touch. Similarly, a contact resistance Rcontact2 may result from the touching of the active layer 410 to the passive layer 420 at the location of the low touch. The contact resistance Rcontact1 and Rcontact2 may vary due to the amount of touch pressure being applied by the respective touch on the touch screen. For example, a touch with light pressure will result in a contact resistance value that is greater than a touch with greater pressure. In addition, a resistance Rp value may be present on the passive layer 420 between the location of the high touch and the location of the low touch. Different voltage potentials may be present at each node of the resistances Ru, Ra, Rd, Rcontact1, Rcontact2, and Rp that may not be directly measured as they are not directly accessible. Additionally, there are two resistances RX+ and RX− that may affect the voltage measurement at electrodes 422A and 422B of the passive layer. The effects of the resistances Rx+ and Rx− may be negligible because the electrodes in the passive layer may be connected to a high input impedance module into which any current flow may be negligible.

Since the resistances Ru, Ra, Rd, Rcontact1, Rcontact2, and Rp may vary as the touch location and pressures vary, so too may the voltage values measured at each of the electrodes 412A, 412B, 422A and 422B by the detector.

During a first sampling period as shown in the exemplary scenario of FIG. 4, a DC voltage VCC may be driven to electrode 412A of the touch screen 400 via a switch 415 (shown closed), and the electrode 412B may be connected to ground. A detector (not shown) connected to each of the electrodes 412A, 412B, 422A and 422B may measure the voltage present during the sampling period (first phase). At the occurrence of a second sampling period (second phase), the DC voltage VCC may be driven on the previously passive layer, and to electrode 422A via a switch 425 (shown open), similar to switch 415, and the electrode 422B may be connected to ground. The voltages present at the electrodes 412A, 412B, 422A and 422B may be measured by the sensor (not shown).

Using the exemplary equivalent circuit illustrated in FIG. 5, the further operation of the detector when two touches are applied to the touch screen will be described in more detail.

Figure 5:
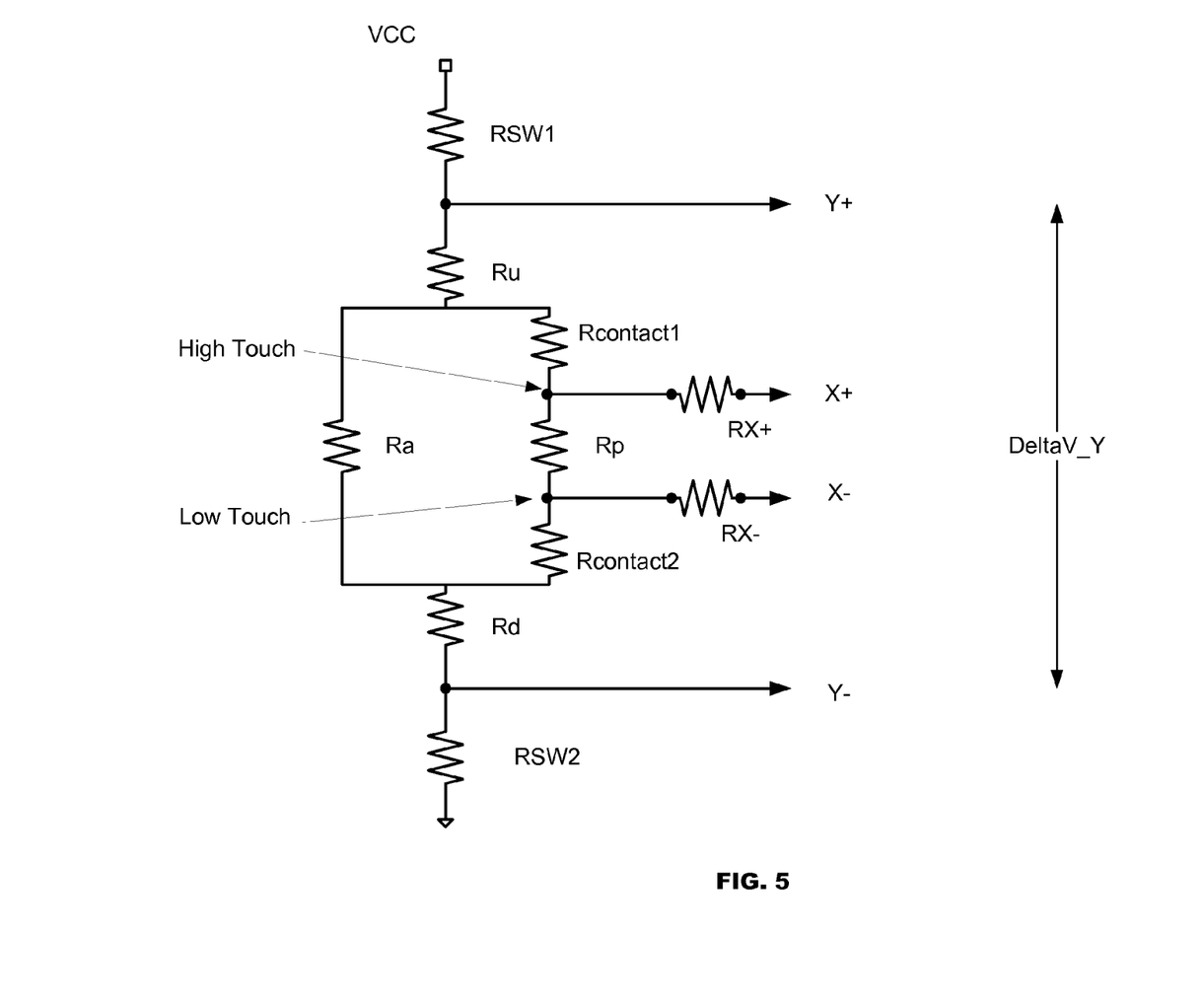
FIG. 5 illustrates an exemplary equivalent circuit of the 4-wire touch screen of FIG. 4 when two touches are applied to the touch screen according to an embodiment of the present invention.

As shown in FIG. 5, when the DC voltage VCC is driven to the touch screen, the voltage Y+ may be present at a node between a first switch resistance RSW1 and the Ru resistance, which may correspond to the location of the electrode 412A. The DC voltage VCC may drop across the first switch resistance RSW1, and a first active layer voltage value, Y+, may be measured at the electrode 412A. A second active layer voltage Y− may be measured at the node between the resistance Rd and a second switch resistance RSW2. The measured voltage Y− may be equal to the drop of DC voltage VCC across the first switch resistance RSW1, Ru, equivalent parallel resistance of resistances Ra, Rcontact1, Rp, Rcontact2, and resistance Rd. A difference voltage between the voltage Y+ and the voltage Y−, called DeltaV_Y, may be calculated, and may be stored in a memory.

The voltages X+ and X− of the passive layer may be present, for example, at the electrodes 422A and 422B of FIG. 4, respectively. These voltages may be primarily the result of the voltage values at the nodes in the passive layer resulting from the touches, high touch and low touch. The voltage X+ may be measured at a node (corresponding to electrode 422A in FIG. 4) between the high touch resistance Rcontact1 and the resistance Rp, while the voltage X− may be measured at a node (corresponding to electrode 422B in FIG. 4) between the resistance Rp and the low touch resistance Rcontact2. The measured voltages X+ and X− may be stored in a memory.

As an example, in the scenario described in FIG. 4, the voltage measured at node X+ may correspond to the location of both contact points but it may be influenced primarily by the first potential point (or high touch location) because of the proximity of the high touch location to the node X+. The voltage at the node X− may correspond to the location of both contact points but it may be influenced primarily by the voltage at the second potential point (or low touch location) because of the proximity of the low touch to the node X−. A method for recognizing and classifying a dual touch gesture based on the measured voltages will be described in more detail with reference to FIG. 6.

Figure 6:
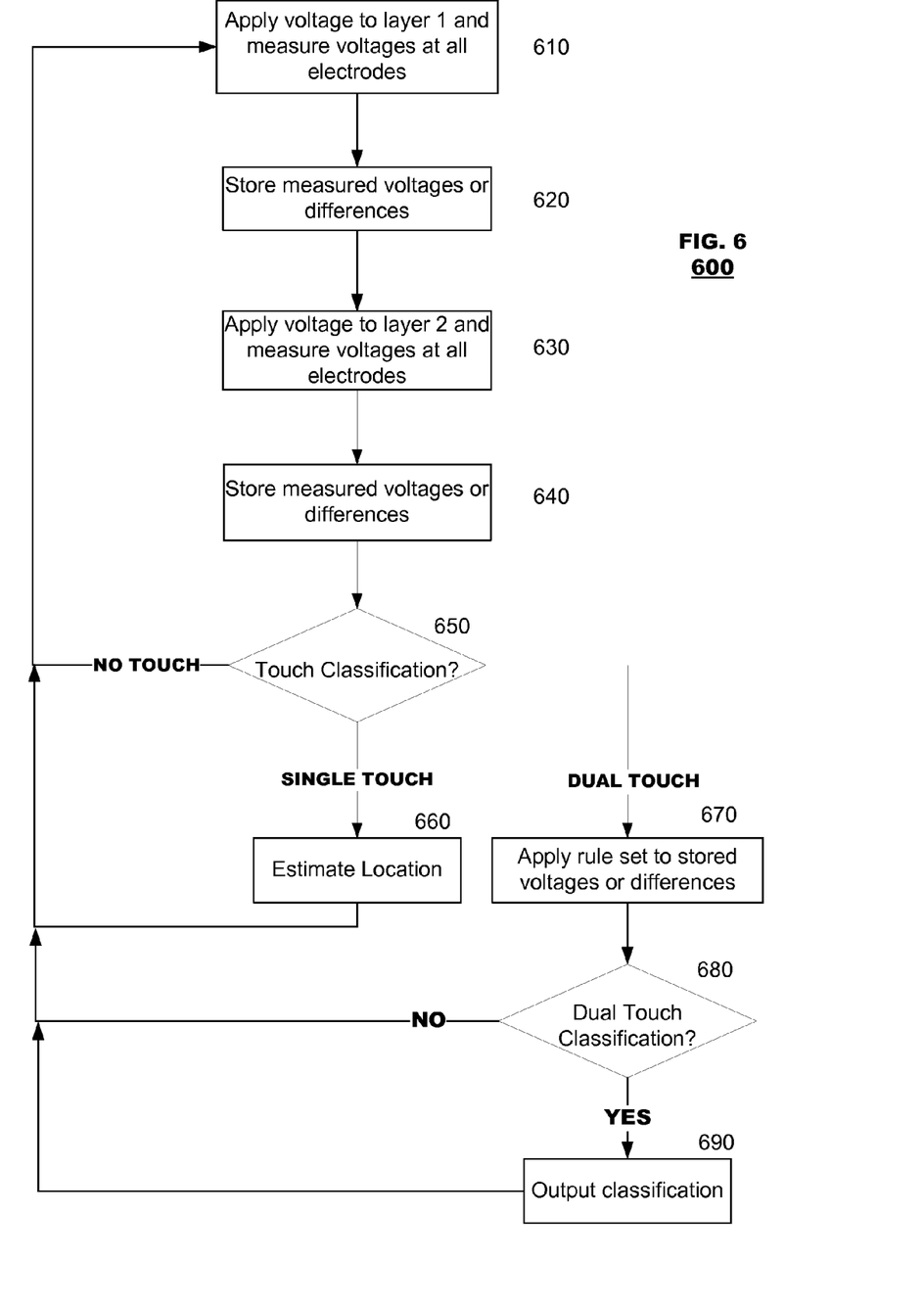
FIG. 6 is flowchart of an exemplary method of classifying a dual-touch gesture input to a touch screen device according to an embodiment of the present invention.

FIG. 6 is flowchart of an exemplary method of classifying a touch including a dual-touch gesture input to a touch screen device according to an embodiment of the present invention. When the touch screen device is in operation, the electrodes of a touch screen may be sampled at, for example, a predetermined interval, or continuously. The exemplary method will also be described with reference to FIG. 4. During sampling, at step 610, a voltage may be applied to a first layer and voltage measurements may be made at each set of the electrodes 412A (Y+), 412B (Y−) and 422A (X+), 422B (X−). The measurements from each of the different electrodes may be made nearly simultaneously. The voltage measurements may be made with respect to ground or may be differential voltage measurements between electrodes. The four voltage measurements (which may include differences between electrode voltages) may be stored in memory (Step 620), as a table or some other data structure.

In step 630, a voltage may be applied to the second layer and voltage measurements may again be made at each set of the electrodes 412A (Y+), 412B (Y−) and 422A (X+), 422B (X−). The voltage measurements (which may include differential voltage measurements between electrodes) may be stored in memory at step 640, also in a table or other data structure.

The stored voltages in the respective active layer, e.g., Y+ and Y−, may be subtracted from one another to arrive at a delta voltage, or difference voltage. For example, when the Y layer is active, a deltaV_Y of the Y layer may be the voltage difference of the measured Y+ voltage and the measured Y− voltage. The deltaV_Y value may indicate information related to the gesture in the Y axis. Similarly, when the X layer is active, the calculated deltaV_X may contain the information related to the gesture in the X axis. The calculated deltaV_Y and deltaV_X values may also be stored in memory. Alternatively, respective differential voltage measurements can be made directly and may be stored as deltaV_Y and/or deltaV_X.

Based on the stored data, at step 650, a classification of whether a touch actually occurred, if a single touch occurred or if a dual touch occurred, may be made. If no touch is determined to have occurred because, for example, the measured voltages did not exceed a threshold voltage and the passive layer is floating, the process 600 returns to step 610. Alternatively, if a single touch is determined to have occurred as explained above, the process 600 proceeds to step 660. At step 660, an estimate of the location of the single touch may be made, and output. After which, the process 600 may return to step 610 to obtain new data.

If it is determined that a dual touch occurred, a rule set may be applied to the measured voltages at step 650. A time evolution, or trends, of the measured voltages may be identified and used when the rule set is applied. Based on comparison of the measured and/or calculated voltages with the rule set, a classification of the inputted gesture may be made (step 680). If a gesture classification is made, a signal indicating the classification of the gesture may be output (step 690). Based on the outputted signal, an action (e.g., a zoom, a pinch, CW/CCW rotation or the like) may be performed that corresponds to the classified gesture. Alternatively, if a classification cannot be made, even to a certain probability, the process 600 may return to step 610 to continue measuring voltages. Use of the measured or calculated differences and voltage trends will be explained in more detail with respect to FIGS. 7A and 7B.

Figure 7A:
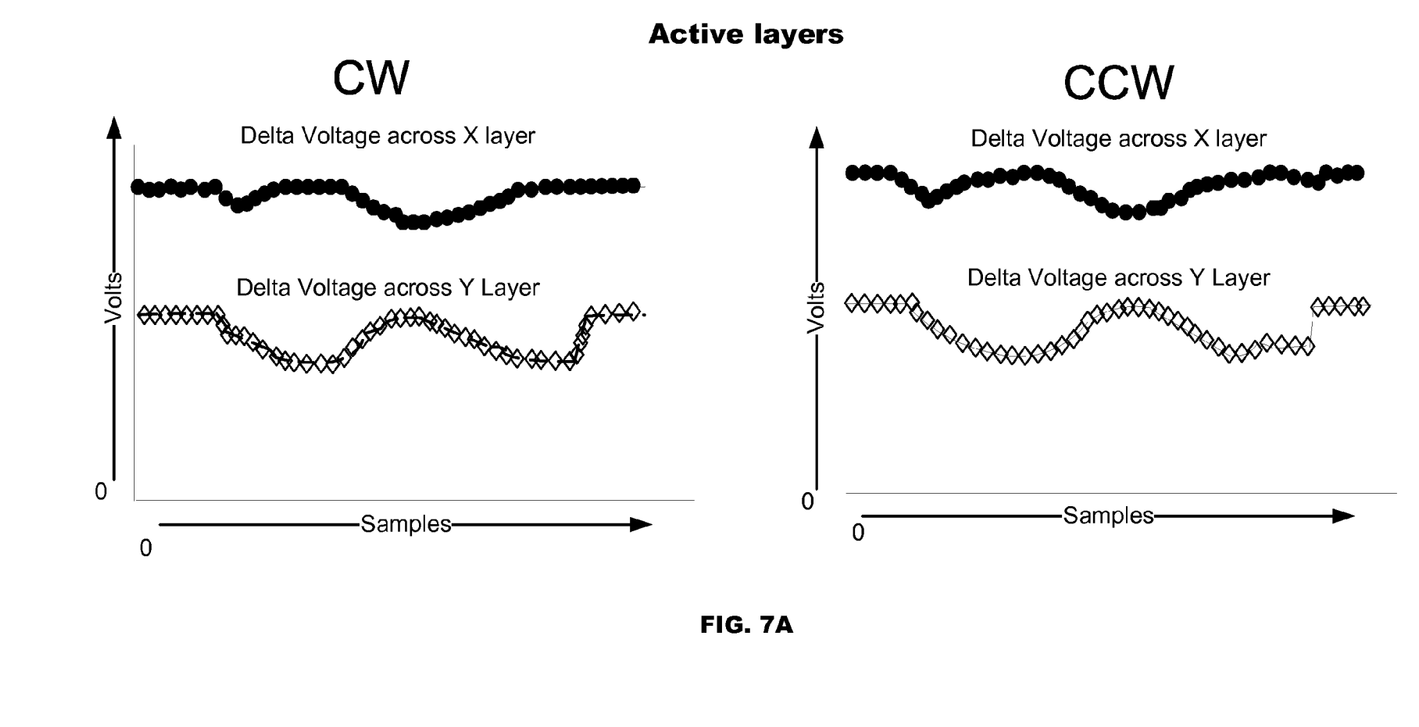
FIGS. 7A and 7B illustrate exemplary charts of sampled voltage values measured according to an embodiment of the present invention.

FIG. 7A provides two charts of exemplary processed results from measurements made in the active layer of a touch screen as a dual-touch gesture as shown in FIG. 4 is rotated in either the clockwise (CW) direction or the counter-clockwise (CCW) direction over time. Specifically, FIG. 7A shows the delta voltage from each active layer Y and X. When the gesture is rotating in a clockwise direction as shown in the left-side CW chart, the delta voltage determined (or measured directly) for the X layer over a number of samples is counterphase to the delta voltage determined for the Y layer. Similarly, when the gesture is rotating in a counter-clockwise CCW direction as shown in the right-side CCW graph, the delta voltages in the X layer may again be in counterphase with the delta voltages determined (or measured directly) for the Y layer. Accordingly, additional information may be required to determine the actual direction of rotation of a dual-touch gesture.

Figure 7B:
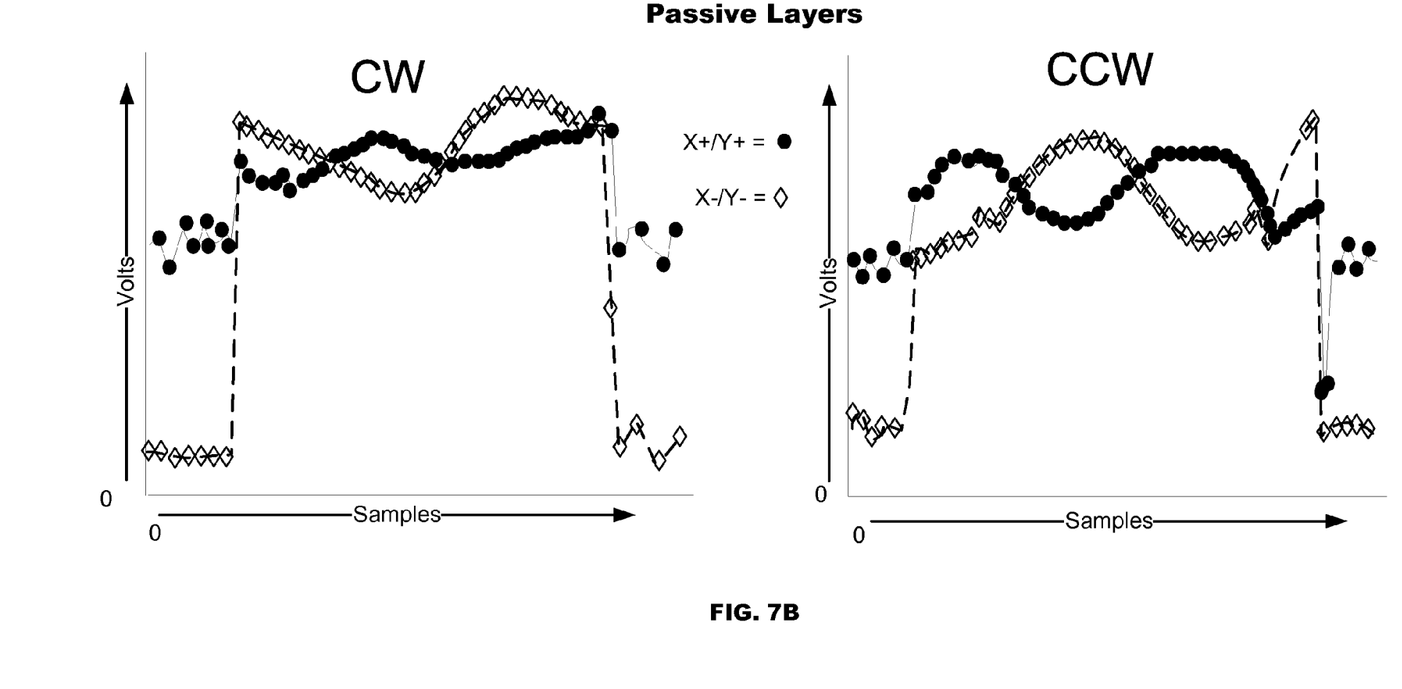

FIG. 7B provides two charts of exemplary processed results from measurements made in the passive layer as a dual-touch gesture as shown in FIG. 4 is rotated in either the clockwise (CW) direction or the counter-clockwise (CCW) direction.

During a CW rotation as shown in the left-side CW chart, the sampled voltages of the X+/Y+ electrodes in the respective passive layers may be initially less than the X−/Y− sampled voltages of the same passive layer, respectively. However, as the gesture rotation progresses, the X+/Y+ sampled voltages increase as the respective X−/Y− voltages decrease to a low point at approximately the mid point of the samples. From the sample mid point, the respective X−/Y− sampled voltages begin increasing to again be greater than the X−/Y− sampled voltages.

Conversely, in the right-side CCW chart, the Y− sampled voltages are initially less than the X+/Y+ sampled voltages, but as the gesture rotation progresses, the X−/Y− sampled voltages increase as the X+/Y+ voltages decrease to a low point at approximately the mid point of the samples. From the sample mid point, the X+/Y+ sampled voltages begin increasing to again be greater than the X+/Y+ sampled voltages. The variation in the voltage measurements across the number of samples can be used to indicate whether the two-touch gesture is being applied to the touch screen in either a CW direction or a CCW direction. The exemplary measurements are similar to when either the Y layer or the X layer is passive. Since the measurements at either passive layer, Y or X, may provide a similar voltage plot, the voltages made from a passive X layer may provide redundant confirmation of the conclusion drawn from interpretation of the passive Y layer measurements, and vice versa. Alternatively, an average of the two measured voltage sets (i.e., X+ and Y+) may be obtained and used for the trend analysis for the case of rotations.

Comparisons of the sampled values for each of the Y+ electrode and the Y− electrode (or X+ and X− electrodes) of the passive layers in combination with the calculated difference values from the active layers may provide sufficient information to determine the direction of the two touch gesture, and thereby classify the gesture.

Additional information regarding the gesture may also be obtained from the stored measurement data. For example, the detection of the maxima and minima in deltaV_X and deltaV_Y evolutions may be used to estimate the angle of rotation. Additionally, the evolution of the magnitude of the deltaV_X and deltaV_Y may be used to increase the resolution of the amount of rotation. For example, the difference between a maximum and a minimum (or vice versa) may be 90° and may have an intermediate point when these magnitudes cross each other. Therefore, a 45° resolution may be achieved.

Based on the exemplary measurements shown in FIGS. 7A and 7B, specific rule sets may be formulated for a 4-wire touch screen made by a particular manufacturer. Alternatively, a general rule set may be derived for a wide class of 4 wire touch screens made either by a particular manufacturer or various manufacturers. A general rule set may, for example, contain the following rules:

If deltaV_X and deltaV_Y are both constant, and their value is a nominal value (i.e., a value when there is no touch), a single touch may be determined to have occurred;

If deltaV_X and deltaV_Y are both constant and their value is lower than the nominal, a dual touch may be determined to have occurred; and If either deltaV_Y or deltaV_X show a variation over time, it may be determined that a dual-touch gesture may have occurred. The dual-touch gesture may be classified based on the following:

a vertical zoom in, if deltaV_Y increases and deltaV_X is constant;

a vertical zoom out, if deltaV_Y decreases and deltaV_X is constant;

a horizontal zoom in, if deltaV_X increases and deltaV_Y is constant;

a horizontal zoom out, if deltaV_Y decreases and deltaV_X is constant;

a diagonal zoom out, if both voltage differences increase; and a diagonal zoom in, if both voltage differences decrease.

The zoom factor in each direction may depend on the delta voltage increase rate. The zoom factor may not be exactly proportional to the voltages rate of variation. However, a linear relationship between variations and the zoom factor may give sufficient approximation of the desired amount of zoom. In addition, the ratio between the delta voltage variations in both directions may be used to determine the aspect ratio of the zoom. For example, in a vertical zoom, since the deltaV_X remains constant, the amount of zoom in the X direction also remains constant, while in the Y direction the zoom increases. Similarly, in a diagonal zoom where both the delta voltage for both directions change, the larger of the delta voltages, for example, the Y delta voltage, may indicate that the amount of zoom in the Y direction should be greater than in the X direction.

Similarly, in another rule, a gesture may be classified as a sliding or dragging in the X direction, if, for example, deltaV_Y is constant (below nominal), and there is an increase or decrease in deltaV_X (depending on the direction of the gesture). Conversely, the gesture may be classified as a sliding or dragging in the Y direction, if it is determined that deltaV_X is constant (below nominal) and deltaV_Y is increasing or decreasing (depending on the direction of the gesture).

In another rule, the gesture may be determined to be a rotation, if the deltaV_X and deltaV_Y change in the opposite direction (i.e. when one increases the other decreases, or vice versa). The direction of the rotation may be determined based on the voltages measured at the passive layer.

For example, a clockwise (CW) rotation may be indicated, if in:

a first set of measurements: deltaV_X decreases, deltaV_Y increases, and the passive layer voltage measurement of X− is greater than the voltage of X+; and a second set of measurements: deltaV_X increases, deltaV_Y decreases, and the passive layer voltage measurement X− is less than the voltage X+.

While a counter-clockwise (CCW) rotation may be indicated, if in:

a first set of measurements: deltaV_X decreases, deltaV_Y increases, and the passive layer voltage measurement X− is less than the voltage X+; and a second set of measurements: deltaV_X increases, deltaV_Y decreases, and the passive layer voltage measurement X− is greater than the voltage X+.

The above described recognition of a dual-touch gesture was based on an analysis of the trend (time evolution) of the measured voltage differences. There are alternative algorithms for recognizing dual-touch gestures or that may be used in combination with the described trend analysis. For example, Markov chains and probabilistic criteria may also be used to derive a rule set for recognizing dual touch gestures. Using a probabilistic method, a probability of the identity of a gesture may be assigned to the gesture as it is sampled, and proceeds according to, for example, the trend analysis. As the values of the samples evolve with each new sample, the probability increases that the gesture matches specific gestures, and the probability decreases that it matches the other remaining gestures. As more samples are obtained, the probability reaches a threshold that it matches a specific gesture, and the specific gesture is validated. Similarly, a Markov chain of probabilities can be set up as the gesture and the sample values progress to the gestures' final state. The probabilistic method and analysis can be implemented in a number of ways, such as using time-delay neural networks. The respective thresholds may be stored in a data storage device.

In addition, a centroid position of a dual touch may also be approximated using a ratiometric transformation of the average of the voltage in the passive layer. For example, the following exemplary equations may be used to calculate the centroid in the Y and X planes, respectively:

$$Yc=(Y\_length/VCC)*(Vx++Vx-)/2 \qquad (Eq.\ 1);$$

$$Xc=(X\_length/VCC)*(Vy++Vy-)/2 \qquad (Eq.\ 2);$$

where Y_length is the length of the touch screen in the Y axis, X_length is the length of the touch screen in the X axis, Vx+ and Vx− are the voltages measured in the X layer when it is passive, and Vy+ and Vy− are the voltages measured in the Y layer when it is passive. In an example, assume a touch screen has a usable area of 50 mm×100 mm, and is supplied by 3.3V power supply. If, for example, Vx+=1V; Vx−=1.5V; and Vy+=1.6V; and Vy−=2V; then:

$$Yc=(Y\_length/VCC)*(Vx++Vx-)/2=(50/3.3)*1.25=19\ mm$$

$$Xc=(X\_length/VCC)*(Vy++Vy-)/2=(100/3.3)*1.8=55\ mm$$

The (0,0) position is in one of the corners of the touch screen, and may be the location where one of the two electrodes for each layer may be grounded. The calculated centroid points may be stored in memory, and may be used to perform actions (e.g., more precise zooms or expands, and centering of rotations) based on the calculated centroid points.

The system can also provide the classification of a gesture in two modes. In the first mode, the classification of the gesture is only provided when inputting of the gesture is determined to have been completed. In the second mode, the system may have a threshold set in which, a gesture classification indication is given, for example, when the inputted gesture is determined to be a zoom within, for example, a 51% probability. Of course, the threshold may be set for each individual user, or customer, and/or for each type of gesture. For example, a zoom may have a threshold of 51% probability of being input, while a rotation, which may be more disruptive to the user's viewing experience, may be set at 75% probability. Alternatively, this can be implemented with counters that are increased or decreased as new data are available which match or do not match the gesture. In this second mode, a progressive gesture (e.g. zoom) might be applied within the same gesture as probabilities or counters exceed certain thresholds.

Figure 8:
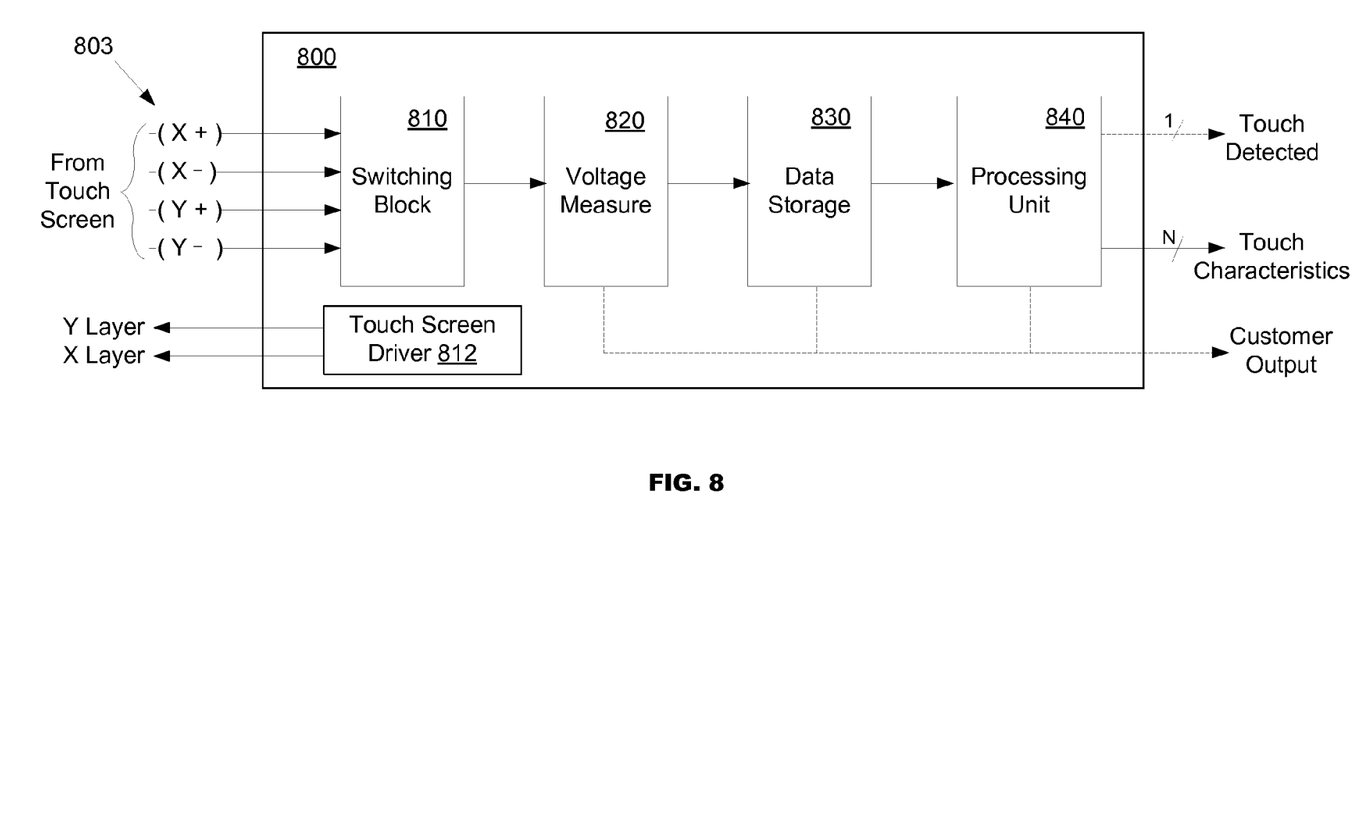
FIG. 8 illustrates a block diagram of a gesture detection and recognition device according to an embodiment of the present invention.

FIG. 8 illustrates an exemplary device for implementing the above described methodology. The exemplary device 800 may comprise inputs 803, a switching block 810, a touch screen driver 812, voltage measure unit 820, data storage 830 and processing unit 840.

The device 800 may have inputs 803 for connecting to a 4-wire resistive touch screen. The touch screen driver 812 may be selectively driven to alternately apply a known voltage to each layer of the touch screen. The inputs 803 may include inputs to connect to the X+, X−, Y+, and Y− electrodes of a 4-wire touch screen input device. The inputs 803 may be selectively switched by a switching block 810 to provide an input to the voltage measure unit 820. The touch screen driver 812 may drive the touch screen according to a clocking signal. The voltage measure unit 820 may include a multiplexer and an analog-to-digital converter (ADC) (not shown). The voltage measure unit 820 may output values representative of either an analog voltage or a digital code value. The values output from the voltage measure unit 820 may be stored.

The processing unit 840 may process the values stored in data storage 830 using logic to process the stored signals. The processing unit 840 may comprise logic containing a rule set as described above that may manipulate and classify the stored data related to the inputted gestures as a specific gesture. The logic of processing unit 840 may implement gesture algorithms to recognize and classify the respective gestures using the stored data.

In more detail, the switching block 810 may selectively switch the inputs 803 between inputs for electrodes X+, X−, Y+ and Y−, based on, for example, a clock signal generated either internal to the device 800, or received from an external source (not shown). The clock signal may be the same as, or derived from, the clock signal used by the touch screen driver 812. Voltage measure unit 820 may output a measured voltage as, for example, an ADC digital code representative of the voltages measured at each electrode (X+, X−, Y+, Y−) during a sampling period to the data storage 830. The data storage 830 may comprise memory devices or circuitry capable of storing digital codes, or analog voltages, or both. In alternative embodiments, multiple measurements may be made and may be filtered to reduce noise or to improve accuracy prior to executing a gesture recognition algorithm. Or, measurements of just one electrode may be on a first cycle of alternately driving voltages to the layers of the touch screen, and in subsequent cycles another single electrode may be measured. After a number of cycles, the single measurements may be processed and presented to the gesture recognition algorithm.

Alternatively, the voltage measure unit 820 may output an ADC code(s) from the device 800 directly to a customer-provided part that may perform analysis and gesture classification according to customer algorithms. In another embodiment, measured voltages without being digitized may be provided directly to a customer-provided part that may perform an analog-to-digital conversion and further analysis of the measured data. In yet another embodiment, data may be provided to, or extracted directly by, a customer device from either the data storage 830 or the processing unit 840.

The processing unit 840 logic may perform the calculations using the stored voltage measurements and calculations described above with respect to FIGS. 4, 6A and 6B, and may apply the above described rules to the received signals, and the calculation results may be used to classify the inputted gesture.

Outputs of the processing unit 840 may include a signal indicating that a touch was detected and another signal indicating characteristics of the detected touch. For example, when a single touch is detected, a logic signal may be output on a touch detected output line, either as a high or a low signal. The detected touch may be determined by the processing unit 840 to be a single touch, so the signal output on the touch characteristics output line may provide a multi-bit code representing the position of the single touch on the touch screen. Alternatively, in the case of a dual touch, a signal output on the touch detected output line may indicate a dual touch was detected, and a multi-bit code may be output on the touch characteristics output line indicating the classification of the dual touch gesture as one of the various types of two-touch gestures described above. The touch characteristics multi-bit code may include quantitative data such as zoom factors, rotation angles or dragging length. Alternatively, the processing unit 840 may simply pass the ADC outputs from the device 800 to a customer-provided device to allow the customer to analyze the ADC codes and utilize its own gesture interpretation algorithms. In another alternative, the processing unit 840 may be bypassed completely and the measured data may be provided to a customer-provided device.

The processing unit 840 may comprise a processor that accesses a data storage medium, such as a read only memory (ROM), random access memory (RAM), miniature hard disk drive or the like, to retrieve program instructions to execute the above described method.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure.

We claim:

1. A detection method for a four-wire touch screen device, comprising: in a first phase of operation, while a predetermined potential is driven across a first resistive sheet material of the device, reading voltages from:
   a first pair of electrodes on the first resistive sheet material, and
   a second pair of electrodes on a second resistive sheet material of the device; in a second phase of operation, while another predetermined potential is driven across the second resistive sheet material, reading voltages from:
   the first pair of electrodes, and the second pair of electrodes;
determining a first difference voltage between the voltages measured at the first pair of electrodes during the first phase and a second difference voltage between the voltages measured at the second pair of electrodes during the second phase; and
classifying a gesture type of a dual-touch user interaction with the resistive sheet materials based on a comparison of the first and second difference voltages to a rule set over multiple first and second phases of operation, the comparison to the rule set identifying a change over time of at least one of: the first difference voltage, or the second difference voltage.

2. The detection method of claim 1, further comprising, when a pair of contact points are determined, calculating a centroid of the pair of contacts.

3. The detection method of claim 1, wherein the classifying includes comparing the first and second difference voltages to a nominal voltage value.

4. The detection method of claim 1, wherein the classifying includes determining whether the first and second difference voltages are substantially constant over a predetermined time period.

5. The detection method of claim 1, wherein the classifying is also based on the voltages read from at least one of the first pair of electrodes during the second phase or the second pair of electrodes during the first phase.

6. A detection method for a four-wire touch screen device, comprising:
in a first phase of operation, while a predetermined potential is driven across a first resistive sheet material of the device, reading voltages from:
a first pair of electrodes on the first resistive sheet material, and
a second pail of electrodes on a second resistive sheet material of the device;
in a second phase of operation, while another predetermined potential is driven across the second resistive sheet material, reading voltages from:
the first pair of electrodes, and
the second pair of electrodes;
determining a first difference voltage between the voltages measured at the first pair of electrodes during the first phase and a second difference voltage between the voltages measured at the second pair of electrodes during the second phase;
comparing the first and second difference voltages and the voltages read from at least one of the first pair of electrodes during the second phase or the second pair of electrodes during the first phase to a rule set over multiple first and second phases of operation, the comparison to the rule set identifying a change over time of at least one of: the first difference voltage, or the second difference voltage; and
based on the comparison, classifying a dual-touch input with the resistive sheet materials according to a gesture type.

7. The method of claim 6, wherein the dual touch input is classified as a zoom.

8. The method of claim 6, wherein the dual touch input is classified as a pinch.

9. The method of claim 6, wherein the dual touch input is classified as a rotation.

10. The method of claim 9, wherein the rotation is classified as a clockwise rotation.

11. The method of claim 9, wherein the rotation is classified as a counter-clockwise rotation.

12. The method of claim 6, wherein the dual touch input is classified as a sliding/dragging.

13. A method for classifying a dual-touch input into a four-wire touch screen including a first layer and a second layer that are alternately an active layer and a passive layer, the method comprising:
measuring, by a voltage detection circuit, first sequential sets off our voltages from electrodes in the first and second layers acting as the active and passive layers, respectively;
storing the first sets off our voltage measurements in a memory;
measuring, by a voltage detection circuit, second sequential sets of four voltages from electrodes in the first and second layers acting as the passive and active layers, respectively;
storing the second sets off our voltage measurements in memory;
determining a sequential set of voltage differences between the voltages measured at each electrode of the active layer in same sets of the first and second sequential sets of voltages;
applying, by a processing device, a rule set to the determined sequential set of voltage differences and voltages of the sequential sets of voltages measured from at least one of the passive layers to classify the dual-touch input, the applying of the rule set identifying a change over time of at least some of the determined sequential set of voltage differences; and
based on the results of the application of the rule set, providing an indication of a gesture type of the dual-touch input that was applied to the touch screen.

14. The method of claim 13, further comprising:
switching inputs from a first set of inputs of the first layer to a second set of inputs of the second layer.

15. The method of claim 13, wherein determining a delta voltage comprises subtracting a voltage measured at a first electrode of the active layer from a voltage measured at a second electrode of the active layer.

16. The method of claim 13, wherein determining a delta voltage comprises directly measuring the differential voltages.

17. The method of claim 13, wherein determining a trend of passive layer voltages comprises comparing a present voltage value to a value of a previously measured voltage to determine whether the present voltage has increased or decreased, and identifying a trend of the measured voltages based on a plurality of stored passive layer voltage measurements.

18. An apparatus for classifying a dual-touch input to a touch screen including a first layer and a second layer that are alternately an active layer and a passive layer, comprising:
a switching block for switching active inputs between the active layer and the passive layer of the apparatus;
a voltage detection circuit for measuring voltage from the active inputs and outputting a digital code representative of the detected voltages, wherein the active inputs alternately correspond to a set of electrodes in the active layer of the touch screen and the passive layer of the touch screen;
a data storage for storing the digital codes; and
a processing unit configured to:
apply a rule set to a sequential set of the stored digital codes representative of voltages measured from the active layer and a sequential set of the stored digital codes representative of voltages measured from the passive layer, the applying of the rule set identifying a change over time of at least some of the voltages measured from the active layer, and based on the application of the rule set to the stored digital codes, providing an indication of the gesture type of the dual-touch input that was applied to the touch screen.

19. The apparatus of claim 18, further comprising an apparatus output connected to the voltage detection circuit for outputting the digital code directly from the apparatus.

20. The apparatus of claim 18, wherein the processing unit is further configured to determine a delta voltage comprises subtracting a voltage measured at a first electrode of the active layer from a voltage measured at a second electrode of the active layer.

21. The apparatus of claim 18, wherein the processing unit is further configured to determine a delta voltage comprises directly measuring the differential voltages.

22. The apparatus of claim 18, wherein the processing unit is further configured to: determine a trend of passive layer voltages by comparing a stored digital code to a digital code of a previously measured voltage to determine whether the digital codes indicate increasing or decreasing voltages, and identifying a trend of the measured voltages based on the determination.

23. The apparatus of claim 18, wherein the voltage detection circuit comprises: an analog-to-digital converter for converting measured voltages in to representative digital codes.

24. A non-transitory computer readable storage medium containing program instruction for causing a processor to execute a method for classifying a dual-touch input into a four-wire touch screen including a first layer and a second layer that are alternately an active layer and a passive layer, the method comprising:

determining a sequential set of voltage differences between voltages measured at each electrode of the active layer for each of the first and second layers being the active layer;

determining a sequential set of voltages measured at each electrode of the passive layer for each of the first and second layers being the passive layer;

applying a rule set to the determined sequential set of voltage differences and the sequential set of the voltages measured from the passive layers to classify a gesture type of the dual-touch input, the applying of the rule set identifying a change over time of at least some of the sequential set of voltage differences; and based on the results of the application of the rule set, providing an indication of the gesture type of the dual-touch input that was applied to the touch screen.

25. An apparatus for classifying a dual-touch input to a touch screen including a first layer and a second layer that are alternately an active layer and a passive layer, comprising:

a touch screen driver for alternately driving the first layer and the second layer as the active layer;

a switching block for switching active inputs to the apparatus, wherein the active inputs are alternately switched from electrodes on the active layer to electrodes on the passive layer;

a voltage detection circuit for measuring voltages from the active inputs; and a processing unit to:

apply a rule set to representations of a sequential set of the voltages measured from the active layer and a sequential set of the voltages measured from the passive layer, the applying of the rule set identifying a change over time of at least some of the sequential set of voltages measured from the active layer, and based on the application of the rule set, determine a gesture type of the dual-touch input that was applied to the touch screen.

26. The apparatus of claim 25, wherein the voltage detection circuit includes an analog to digital converter including outputs for outputting digital codes representing the measured voltages from the electrodes of the active layer and the electrodes from the passive layer;

the apparatus further comprising:

a data storage for storing digital codes generated by the voltage detection circuit, wherein the data storage is connected to the outputs.

27. The apparatus of claim 25 further comprising;

a data storage for storing the digital codes;

wherein the processing unit includes an output for outputting an indication of the gesture type of the dual-touch input that was applied to the touch screen.

28. The apparatus of claim 25, wherein the voltage detection circuit comprises: an analog-to-digital converter for converting measured voltages in to representative digital codes.

29. An apparatus for use with a touch screen device, the apparatus comprising:

means for, in a first phase of operation, driving a predetermined potential across a first resistive sheet material of the device and reading voltages from a first pair of electrodes on the first resistive sheet material and a second pair of electrodes on a second resistive sheet material;

means for, in a second phase of operation, driving another predetermined potential across the second resistive sheet material of the device and reading voltages from the second pair of electrodes on the second resistive sheet material and the first pair of electrodes on the first resistive sheet material;

means for determining a first difference voltage between the voltages measured at the first pair of electrodes during the first phase and a second difference voltage between the voltages measured at the second pair of electrodes during the second phase; and means for classifying a gesture type of a dual-touch user input based on the first and second difference voltages and at least one of the voltages on the first pair of electrodes in the second phase of operation or the voltages on the second pair of electrodes in the first phase of operation over multiple first and second phases of operation.

30. The method of claim 29, wherein the classifying includes classifying the user input as at least one of a zoom or a rotation.

31. The method of claim 29, further comprising:

in the first phase of operation, reading voltages from the second pair of electrodes on the second resistive sheet material; and in the second phase of operation, reading voltages from the first pair of electrodes on the first resistive sheet material, wherein the classifying includes classifying the user input based on the voltages read from the second pair of electrodes during the first phase of operation and the voltages read from the first pair of electrodes during the second phase of operation.

* * * * *